(12) United States Patent
Yeh et al.

(10) Patent No.: US 9,857,021 B2
(45) Date of Patent: Jan. 2, 2018

(54) SWIVEL SUPPORTING DEVICE

(71) Applicant: SYNCMOLD ENTERPRISE CORP., New Taipei (TW)

(72) Inventors: Ching-Yi Yeh, New Taipei (TW); Juei-Hsien Wang, New Taipei (TW)

(73) Assignee: Syncmold Enterprise Corp., New Taipei (TW)

( * ) Notice: Subject to any disclaimer, the term of this patent is extended or adjusted under 35 U.S.C. 154(b) by 69 days.

(21) Appl. No.: 15/015,661

(22) Filed: Feb. 4, 2016

(65) Prior Publication Data
US 2017/0037996 A1 Feb. 9, 2017

(30) Foreign Application Priority Data

Aug. 6, 2015 (TW) .............................. 104212640 U

(51) Int. Cl.
*F16M 13/00* (2006.01)
*F16M 11/20* (2006.01)
*F16M 11/12* (2006.01)

(52) U.S. Cl.
CPC ....... *F16M 11/2014* (2013.01); *F16M 11/126* (2013.01); *F16M 2200/08* (2013.01)

(58) Field of Classification Search
CPC ............. F16M 11/2014; F16M 11/126; F16M 2200/08; F16M 11/08; F16M 11/10; F16M 11/2021

USPC ......... 248/125.7, 131, 415, 425, 186.1, 521, 248/349.1, 477, 496, 478, 919–919; 16/297, 319, 363, 376
See application file for complete search history.

(56) References Cited

U.S. PATENT DOCUMENTS

| | | | |
|---|---|---|---|
| 6,286,968 B1 * | 9/2001 | Sailer | B60R 1/0617 248/478 |
| 6,637,898 B2 * | 10/2003 | Hattori | B60R 1/076 248/900 |
| 6,789,976 B2 * | 9/2004 | Hung | F16C 11/10 16/331 |
| 7,273,202 B2 * | 9/2007 | Tien | F16M 11/08 248/289.31 |
| 7,748,680 B2 | 7/2010 | Choi | |
| 7,758,005 B2 | 7/2010 | Uemura | |
| 2004/0108437 A1 * | 6/2004 | Schuurmans | B60R 1/06 248/478 |
| 2009/0166505 A1 * | 7/2009 | Courbon | B60R 1/0605 248/478 |

* cited by examiner

*Primary Examiner* — Christopher Garft
(74) *Attorney, Agent, or Firm* — Muncy, Geissler, Olds & Lowe, P.C.

(57) ABSTRACT

A swivel supporting device comprising a stand, a baseplate and a switchable structure connecting with the stand and the baseplate is provided. The switchable structure includes a plurality of washers being axially associated with each other. An external force for driving the stand and the switchable structure rotating with respect to the baseplate is capable of being adjusted depending on the extent of the engagement interference between the washers.

10 Claims, 7 Drawing Sheets

SWIVEL SUPPORTING DEVICE

CROSS REFERENCE TO RELATED APPLICATION

This application claims the benefits of the Taiwan Patent Application Serial Number 104212640, filed on Aug. 6, 2015, the subject matter of which is incorporated herein by reference.

BACKGROUND OF THE INVENTION

1. Field of the Invention

The present invention relates to a supporting device, and more particularly to a swivel supporting device used for holding a display device and provided with function of pivotal-resistance adjustment.

2. Description of Related Art

Disclosed in U.S. Pat. No. 7,748,680 is a stand that includes a swivel for pivot motion in right and left directions at a predetermined angle. The swivel itself can be pivotally rotated and has multiple bolts each inserted into an arc-shaped guide trough such that the pivot angle of a display device can be adjusted within the range of the guide trough by the swivel.

Although the display device mounted on the disclosed stand can be pivotally rotated, the weight and scale of the display device generally influence the feeling of operation. For instance, when a heavier display device is mounted thereon, it would cause larger loading and total friction on the stand and enhance difficulty in the pivot operation. However, when the display device has a larger panel scale/width, its larger force arm enables a user to more easily adjust the pivot angle of the display device. Thereby, it is not easy to strike a balance between the aforementioned situations.

In other words, most conventional supporting devices can offer rotation function for display devices, but are not well adapted to all types of display devices having different weights and scales. As a result, when the supporting device designed for a specific display scale is used to hold another type of display device having other scale and weight, the supporting device cannot be operated smoothly and the difference in the feeling of operation would cause terrible user experience.

For the reasons stated above, an urgent need exists to develop a new supporting device that can address the aforementioned drawbacks.

SUMMARY OF THE INVENTION

A primary objective of the present invention is to provide a swivel supporting device with a resistance-switchable structure, more particularly with a switchable structure for resistance stepwise adjustment. Accordingly, a user can select an appropriate rank according to the scale and weight of the screen and even the location of force application related to user's habit in operation. Specifically, the friction in the structure can be modulated by adjustment on the extent of the engagement interference in the switchable structure, and the force applied on the display device can be transmitted to the pivot structure to overcome the friction and induce rotary motion of the display device along a horizontal direction for angle adjustment. As the friction is adjustable, a better feeling of operation can be realized.

In accordance with the foregoing objectives, the present invention provides a swivel supporting device that includes a stand, a baseplate and a switchable structure. The switchable structure is disposed on the stand and can rotate synchronously with the stand above the baseplate. The switchable structure includes a first engagement washer, a second engagement washer, an elastic washer and a pivot member. The pivot member penetrates through and clamps the baseplate, the first engagement washer, the second engagement washer and the elastic washer in sequence. The first engagement washer is fastened to the stand and formed with plural recesses of different depths, whereas the second engagement washer has at least one protrusion corresponding to the first engagement washer. The protrusion can be positioned in selective one of the recesses of the first engagement washer. Further, the elastic washer can be forced upward into deformation by the second engagement washer. Accordingly, by virtue of the difference in the interference extent caused by the protrusion of the second engagement washer being positioned in different recesses of the first engagement washer, the friction generated during the rotation of the stand and the switchable structure with respect to the baseplate can be adjusted.

In one embodiment, the pivot member includes a screw and a nut, the screw having a head portion, a body portion and a terminal portion opposite to the head portion and screwed to the nut. The head portion is pressed against the baseplate, whereas the body portion penetrates through the baseplate, the first engagement washer, the second engagement washer and the elastic washer in sequence so as to clamp them between the head portion and the nut. Additionally, the elastic washer may be a bowl-shaped washer, and the baseplate can include a foundation plate and an abutment member fastened to the foundation plate. The foundation plate has an opening to expose a selected portion of the abutment member from the opening and to permit the head portion of the screw to abut against the abutment member.

The body portion of the screw can have a non-circular cross-sectional shape, whereas the first engagement washer has a first through hole in a circular shape and the second engagement washer has a second through hole in a complementary shape to the cross-sectional shape of the body portion. When an external fore is applied on the head portion for rotation of the screw, the second engagement washer would be brought into rotation with respect to the first engagement washer by the screw. Accordingly, the protrusion of the second engagement washer can be switched among the recesses of the first engagement washer. A larger interference extent between the first engagement washer and the second engagement washer can be induced by the engagement of the protrusion with the shallower recess. On the contrary, when the protrusion is engaged with the deeper recess, it would cause smaller interference extent between the first engagement washer and the second engagement washer.

The stand can include a base, an upright extending from the base and a fixing plate associated with the upright for holding a display device. The switchable structure may further include a friction washer that is fastened to the stand and slidably contacts the baseplate, therewith the friction washer and the first engagement washer being fastened to the base. In another embodiment, the base is further formed with a guide trough, and the second engagement washer has an extension portion disposed in the guide trough. When a force is applied on the head portion for the rotation of the screw, the extension portion of the second engagement washer would move within the range of the guide trough so as to restrict the pivot angle of the screw.

In a preferred embodiment, the first engagement washer is formed with three recess sets around circumference, each of which has three recesses of different depths, whereas the second engagement washer has three protrusions corresponding to the three recess sets and capable of being simultaneously positioned in the corresponding recesses with the same depth.

The foregoing and other objects, advantages, and novel features of the invention will become more apparent from the following detailed description when taken in conjunction with the accompanying drawings.

DETAILED DESCRIPTION OF THE PREFERRED EMBODIMENT

Figure 1:
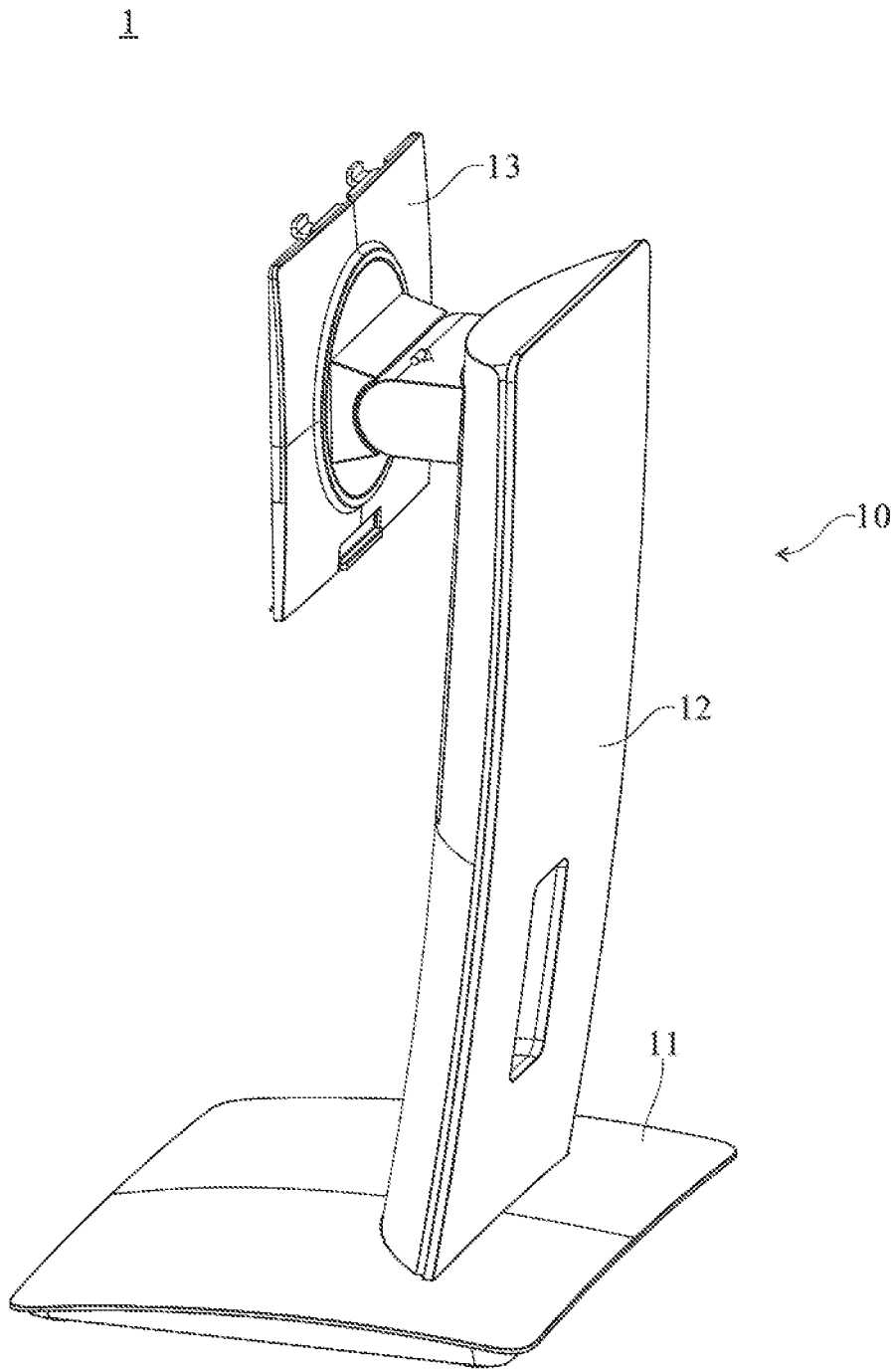
FIG. 1 is a perspective schematic view of a swivel supporting device at one angular orientation in accordance with the present invention.
Figure 2:
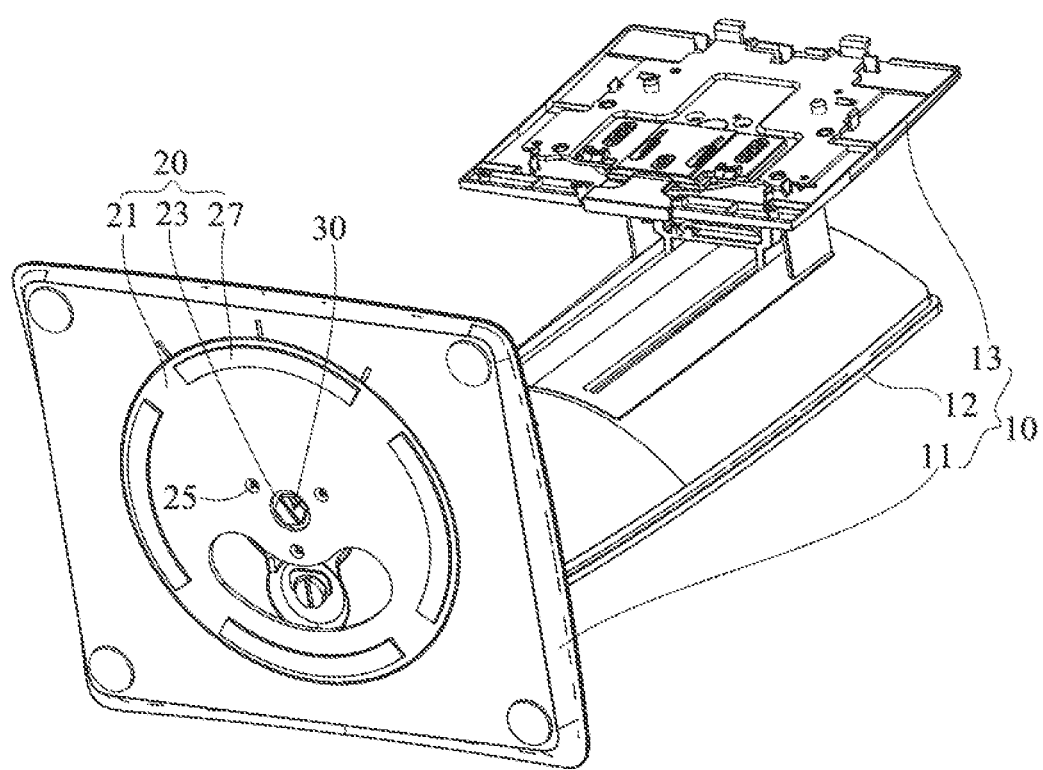
FIG. 2 is a perspective schematic view of a swivel supporting device at another angular orientation in accordance with the present invention.

Please refer to FIGS. 1 and 2, which are perspective schematic views of a swivel supporting device 1 at different angular orientations in accordance with the present invention. The swivel supporting device 1 of the present invention mainly comprises a stand 10, a baseplate 20 and a switchable structure 30. The stand 10 includes a base 11, an upright 12 extending from the base 11, and a fixing plate 13 associated with the upright 12 for holding a display device (not shown in the figures). For clear illustration of the baseplate 20 and the switchable structure 30 of the swivel supporting device 1 hid by the base 11 in FIG. 1, FIG. 2 is further provided to show the swivel supporting device 1 at another angular orientation. Additionally, in this embodiment, the base 11 is formed by die casting, but not limited thereto.

Figure 3:
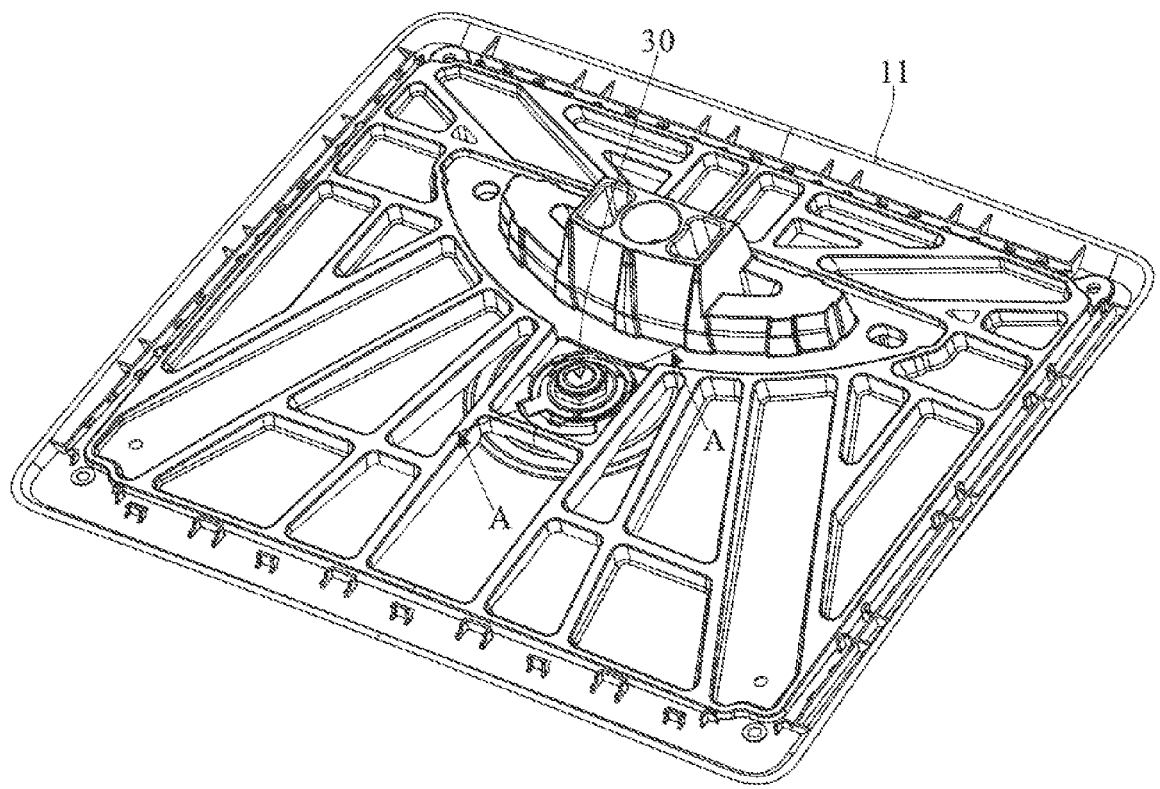
FIG. 3 is a partial perspective schematic view of a swivel supporting device in accordance with the present invention.

In this illustration, the switchable structure 30 is disposed on the stand 10, and thus can be brought into rotation with respect to the baseplate 20 through the operation of the stand 10. Please further refer to FIGS. 3 and 4, in which FIG. 3 is a partial schematic view of the swivel supporting device 1 to illustrate a selected portion of the base 11 and the association of the switchable structure 30 with the base 11 of the stand 10, and FIG. 4 is an exploded schematic view corresponding to FIG. 3.

Figure 4:
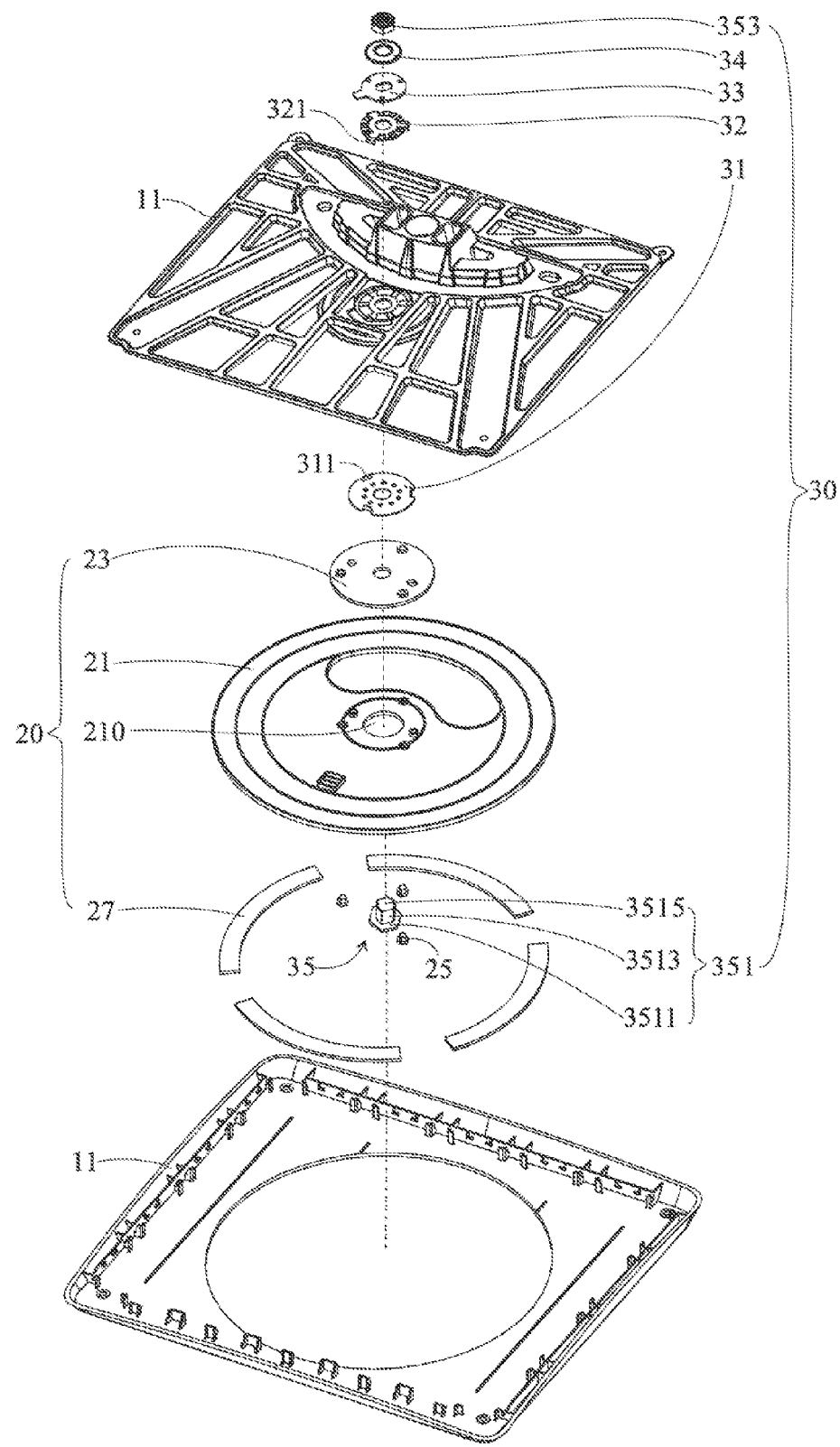
FIG. 4 is an exploded schematic view corresponding to FIG. 3.

As shown in FIG. 4, the switchable structure 30 includes a friction washer 31, a first engagement washer 32, a second engagement washer 33, an elastic washer 34 and a pivot member 35. The pivot member 35 includes a screw 351 and a nut 353, wherein the screw 351 has a head portion 3511, a body portion 3513, and a terminal portion 3515 opposite to the head portion 3511 and screwed to the nut 353. The body portion 3513 penetrates through the baseplate 20, the friction washer 31, the first engagement washer 32, the second engagement washer 33 and the elastic washer 34, whereas the head portion 3511 of the screw 351 is pressed against the bottom surface of the baseplate 20. As such, the baseplate 20, the friction washer 31, the first engagement washer 32, the second engagement washer 33 and the elastic washer 34 are clamped between the head portion 3511 and the nut 353. Preferably, the elastic washer 34 is a bowl-shaped washer.

Specifically, the friction washer 31 is disposed below the base 11 of the stand 10 and fastened to the bottom of the base 11 and slidably and rotatably contacts the baseplate 20, whereas the first engagement washer 32 is disposed above and fastened to the base 11 of the stand 10. As shown in FIG. 4, the friction washer 31 has plural protrusions 311 at its peripheral edge that are fastened to the base 11. Likewise, the first engagement washer 32 has plural protrusions 321 at its peripheral edge that are fastened to the base 11 at the joints. Accordingly, the first engagement washer 32 and the friction washer 31 are disposed on both upper and lower sides of the base 11, respectively, and are fastened to the base 11. When the stand 10 and its base 11 rotate, the first engagement washer 32 and the friction washer 31 can also be brought into rotation therewith.

Please referring to FIGS. 2 and 4, the baseplate 20 includes a foundation plate 21 and an abutment member 23 fastened to the foundation plate 21 by, for example, the screws 25. The foundation plate 21 is formed with an opening 210 to expose a selected portion of the abutment member 23 from the opening 210. Accordingly, the head portion 3511 of the screw 351 can be pressed against on the abutment member 23. Preferably, the baseplate 20 further includes a foot pad 27 attached to the foundation plate 21. The foot pad 27 can be maintained stationary by static friction between the foot pad 27 and a horizontal working face (such as desk).

Figure 5:
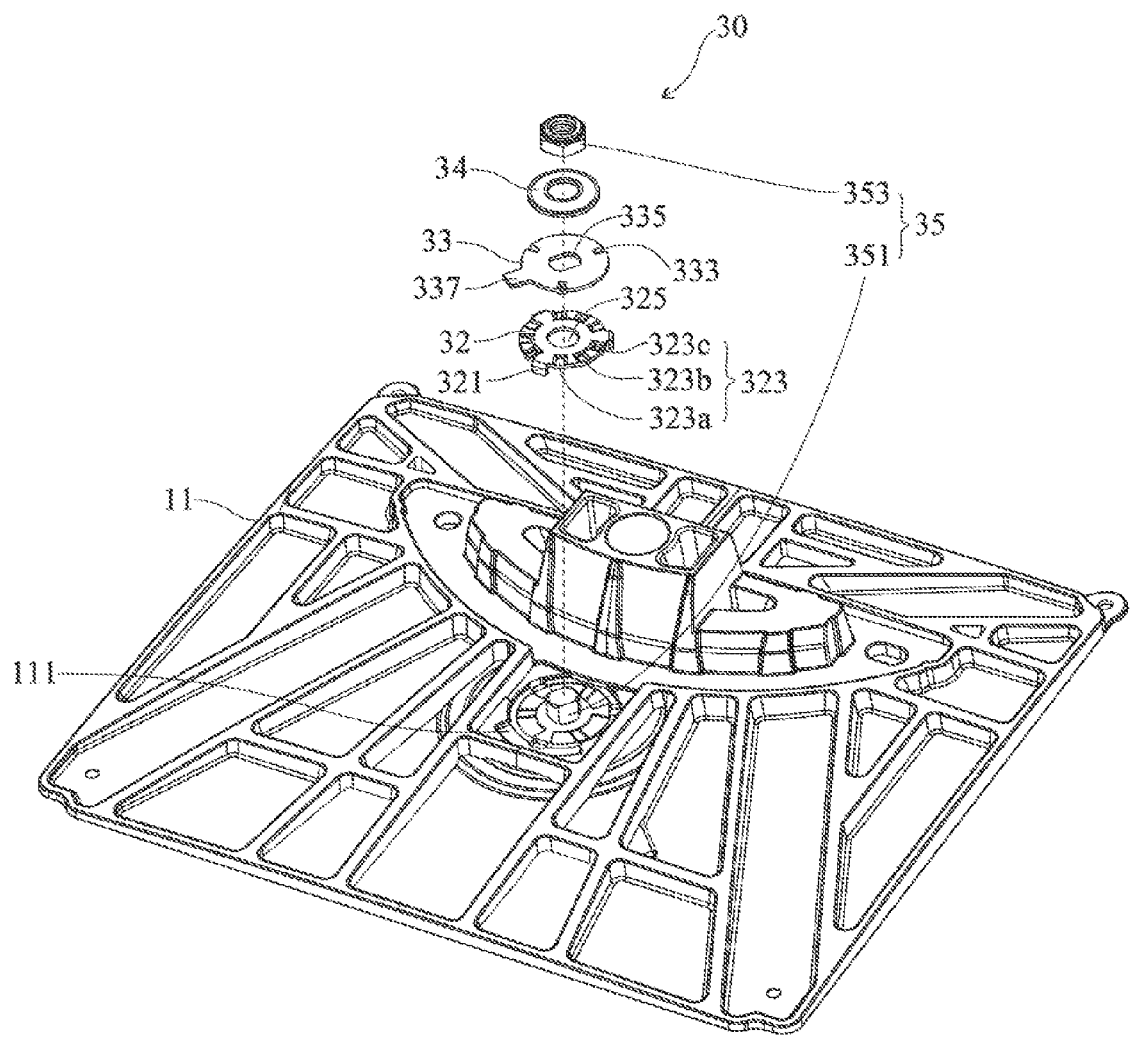
FIG. 5 is a partial exploded schematic view corresponding to FIG. 3.
Figure 6:
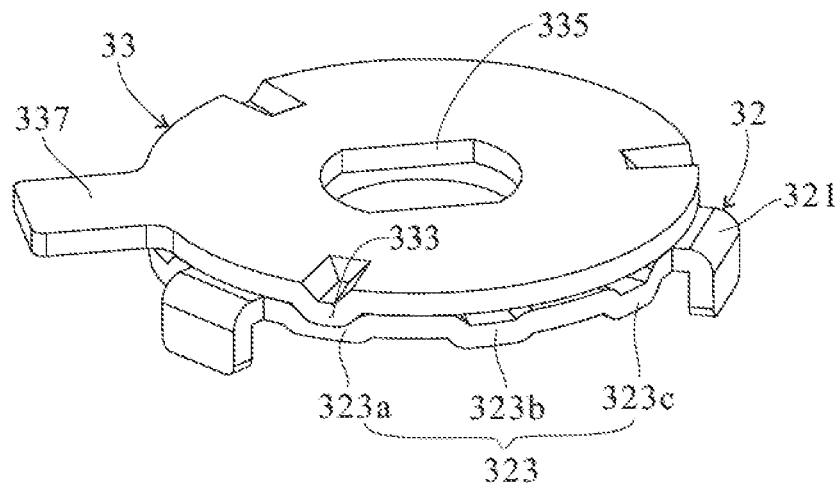
FIGS. 6 and 7 are partial enlarged perspective schematic views of the first engagement washer and the second engagement washer in different relative positions.
Figure 7:
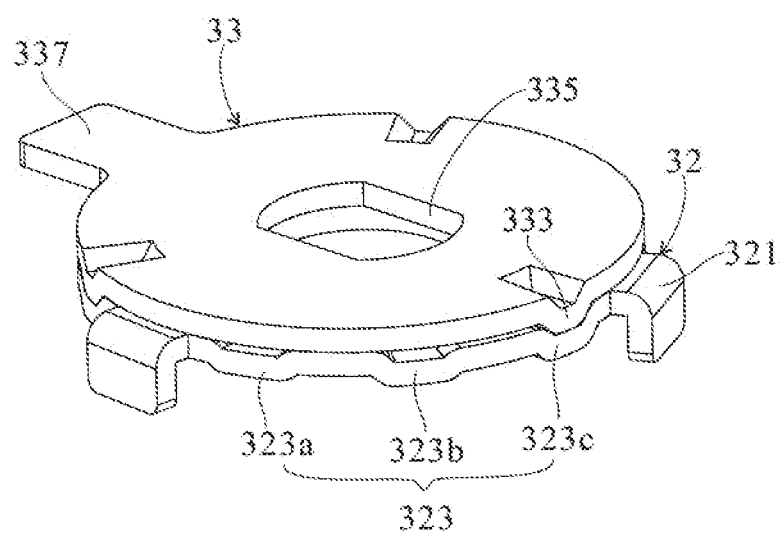
Figure 8:
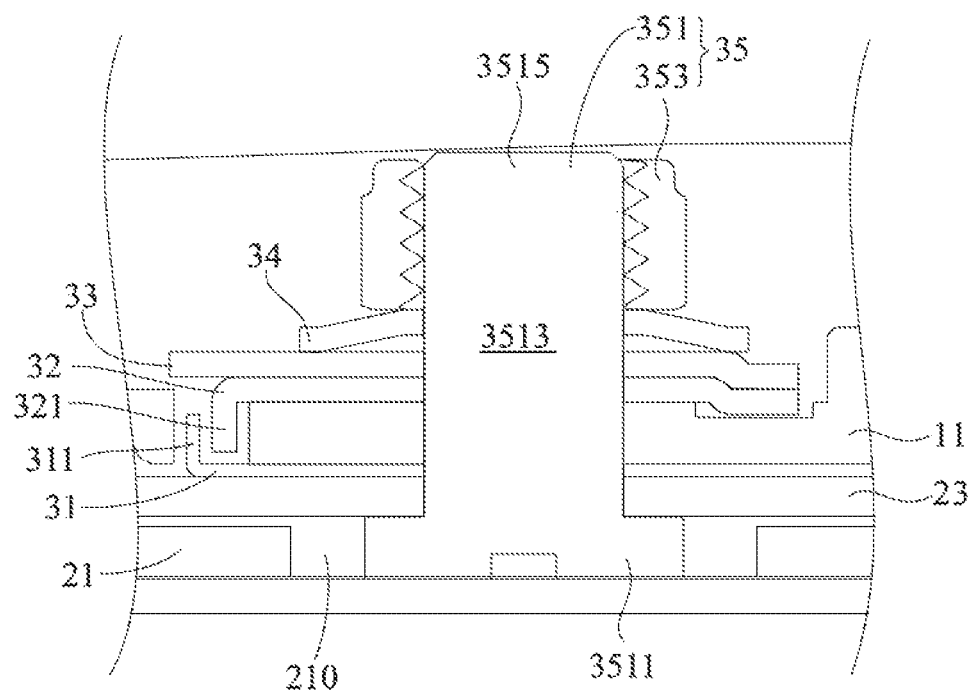
FIG. 8 is a cross-sectional view taken along line AA' in FIG. 3.

Attention is now directed to FIGS. 5-8 for detailed illustration of the configuration of the switchable structure 30 and the manner of assembling the switchable structure 30 with other components in accordance with a preferred embodiment. FIG. 5 is a partial exploded schematic view showing the lower components below the base 11 in an assembled state and the upper components above the base 11 in an exploded state. FIGS. 6 and 7 are partial enlarged perspective schematic views of the first engagement washer 32 and the second engagement washer 33 in different relative positions. FIG. 8 is a cross-sectional view taken along line AA' in FIG. 3.

As shown in FIG. 5, the first engagement washer 32 is formed with three recess sets 323, each of which occupies about ⅓ of the circumference. In this embodiment, apparently from FIGS. 6 and 7, each recess set 323 has recesses 323a, 323b and 323c of three different depths, and the recesses 323a and 323c are the deepest and the shallowest ones, respectively. Additionally, the second engagement washer 33 has three symmetrically arranged protrusions 333 on its surface, each of which corresponds to one recess set 323. As such, the protrusion 333 can be switched among the recesses 323a, 323b and 323c, with different depths, of its corresponding recess set 323, and all protrusions 333 would be simultaneously positioned in the corresponding recesses 323a, 323b or 323c with the same depth. In other words, when one protrusion 333 is positioned in the deepest recess 323c, as shown in FIG. 7, the other two protrusions 333 would also be positioned in their corresponding deepest recesses 323c.

Hereafter, the association of the pivot member 35 with the first and second engagement washers 32, 33 is further illustrated. The body portion 3513 of the screw 351 has a non-circular cross section, whereas the first engagement washer 32 has a first through hole 325 in a circular shape and the second engagement washer 33 has a second through hole 335 in a complementary shape to cross-sectional shape of the body portion 3513 of the screw 351. Accordingly, only the second engagement washer 33 would rotate along with the screw 351. Specifically, when an external fore is applied on the head portion 3511 of the screw 35 for rotating, the second engagement washer 33 would be brought into rotation with respect to the first engagement washer 32 that is maintained stationary during the rotation of the screw 351 due to being fastened to the base 11 and having the first through hole 325 in a circular shape. As a result, the protrusion 333 of the second engagement washer 33 can be switched among the recesses 323a, 323b and 323c, with different depths, of the first engagement washer 32.

In this illustration, the head portion 3511 of the screw 351 is designed into a hexagonal shape and can be pivoted by a hexagon socket or by a flathead screwdriver into a slot of the head portion 3511. Alternatively, the head portion 3511 of the screw 351 may be configured to have a hex socket to permit the insertion of an Allen key for rotation. However, the screw shape and driving manner are not limited thereto. In adjustment, as only the second engagement washer 33 would be induced into rotary motion by the screw 351, the protrusion 333 of the second engagement washer 33 can be switched to be positioned in selective one of the recesses 323a, 323b and 323c of the first engagement washer 32. Upon the protrusion 333 of the second engagement washer 33 being positioned in selective one of the recesses 323a, 323b and 323c of the first engagement washer 32 by the rotation of the screw 351, the engaged position would be maintained without any undesirable change.

Additionally, as shown in FIG. 8, the protrusion 311 of the friction washer 31 and the protrusion 321 of the first engagement washer 32 are fastened to the base 11, whereas the baseplate 20, the friction washer 31, the first engagement washer 32, the second engagement washer 33 and the elastic washer 34 are securely clamped between the head portion 3511 and the nut 353. Please further referring to FIG. 7 in conjunction with FIG. 8, in the case of the protrusion 333 being located against and engaged with the deeper recess 323c, as the recess 323c can accommodate the protrusion 333 in whole, the interference extent between the first engagement washer 32 and the second engagement washer 33 would be smaller, resulting in smaller deformation of the elastic washer 34 caused by pushing-upward of the second engagement washer 33. Therefore, the lifting force applied on the screw 351 due to the nut 353 being pushed upward by the elastic washer 34 would be smaller. As a whole, the clamping force applied on the baseplate 20 by the switchable structure 30 is smaller and causes smaller friction therebetween. Accordingly, when an external force is applied along a horizontal direction by a user to rotate the stand 10 with respect to the baseplate 20, the friction between the switchable structure 30 and the baseplate 20 can be easily overcome, resulting in light feeling of operation.

Attention is now directed to FIG. 6 in conjunction with FIG. 8 for illustration of another engaged state. When the protrusion 333 is located against and engaged with the shallower recess 323a, the recess 323a cannot completely accommodate the protrusion 333, resulting in larger interference extent between the first engagement washer 32 and the second engagement washer 33. As the elastic washer 34 is forced upward with larger deformation by the second engagement washer 33 pushed upward by the first engagement washer 32, the lifting force applied on the screw 351 due to the nut 353 being pushed upward by the elastic washer 34 would be larger. As a result, the clamping force applied on the baseplate 20 by the switchable structure 30 is larger and causes larger friction therebetween. Accordingly, when an external force is applied along a horizontal direction by a user to rotate the stand 10 with respect to the baseplate 20, the larger friction between the switchable structure 30 and the baseplate 20 would result in heavy feeling of rotation operation.

In other words, by virtue of the different interference extents between the protrusions 333 of the same height and the recesses 323a, 323b and 323c of different depths, different frictions would be generated by the normal force when the switchable structure 30 clamps the baseplate 20. As a result, different external forces are required to overcome the friction for the rotation of the stand 10 and the switchable structure 30 with respect to the baseplate 20. In the case of holding a heavier display device, as the display device itself offers normal force on the baseplate 20 and induces a considerable friction, the protrusion 333 should be engaged with the deeper recess 323c to alleviate the increase of the normal force of the switchable structure 30 clamping the baseplate 20 to avoid excessive friction and to obtain appropriate feeling of operation.

It can be understood that three recess sets 323, each of which has recesses 323a, 323b and 323c of three different depths, and three protrusions 333 illustrated in this embodiment are provided only for exemplary explanation, and the present invention is not limited to the illustrated quantity and recess depth. One of ordinary knowledge in this art can make any possible modifications and variations for the practice of the present invention according to requirement. For instance, the first engagement washer 32 may be configured to have only at least two recesses of different depths and the second engagement washer 33 can have at least one protrusion corresponding to the first engagement washer 32. Accordingly, the protrusion can be positioned in selective one of the recesses of the first engagement washer 32 so as to realize the switch function in accordance with the present invention.

Additionally, as another embodiment of the present invention, the present invention may be practiced by that the friction washer is omitted and the base 11 directly contacts the baseplate 20 so that friction is generated therebetween during rotation.

In a preferred embodiment of the present invention, a guide mechanism is further provided to prevent the undesirable rotation of the screw 351. Please referring to FIG. 5 again, the base 11 can have a guide trough 111, and the second engagement washer 33 has an extension portion 337. After assembly, the extension portion 337 would be located in the guide trough 111. When a force is applied on the head portion 3511 for the rotation of the screw 351, the second engagement washer 33 would rotate synchronously with the screw 351 and the movement of the extension portion 337 is restricted within the guide trough 111. As the pivot angle of the screw 351 is limited within the movement range of the extension portion 337 in the guide trough 111, the single protrusion 333 of the second engagement washer 33 would be confined in selective one of the recesses 323a, 323b and 323c of the single recess set 323.

As illustrated above, the swivel supporting device 1 of the present invention can be placed on a horizontal working face and permit a display device to be mounted on the fixing plate 13. The present invention is characterized in that the switchable structure 30 can be adjusted to an appropriate rank according to the scale and weight of the display device. When the display device is pushed for rotation, the baseplate 20 would be stationary with respect to the horizontal working face, whereas the switchable structure 30 is brought into rotation along with the upright 12 and the base 11. In the meanwhile, the friction washer 31 would cause friction on the abutment member 23 of the baseplate 20 and rotate with respect to the baseplate 20. By proper lubrication, smooth operation can be achieved.

Accordingly, in the swivel supporting device of the present invention, the force-transmitting structure can be adjusted stepwise to select an appropriate rank for better feeling of operation according to the scale and weight of the display device and even the location of force application related to user's habit in operation.

The above examples are intended for illustrating the embodiments of the subject invention and the technical features thereof, but not for restricting the scope of protection of the subject invention. Many other possible modifications and variations can be made without departing from the spirit and scope of the invention as hereinafter claimed. The scope of the subject invention is based on the claims as appended.

What is claimed is:

1. A swivel supporting device, comprising:
   a stand;
   a baseplate; and
   a switchable structure, disposed on the stand and capable of rotating synchronously with the stand above the baseplate and including a first engagement washer, a second engagement washer, an elastic washer and a pivot member, wherein
   the pivot member includes a screw and a nut, the screw penetrates through and clamps the baseplate, the first engagement washer, the second engagement washer and the elastic washer in sequence;
   the screw has a head portion, a body portion and a terminal portion opposite to the head portion and screwed to the nut;
   the head portion is pressed against the baseplate, whereas the body portion has a non-circular cross-sectional shape and penetrates through the baseplate, the first engagement washer, the second engagement washer and the elastic washer in sequence so as to clamp the baseplate, the first engagement washer, the second engagement washer and the elastic washer between the head portion and the nut;
   the first engagement washer is fastened to the stand and has a first through hole in a circular shape and plural recesses of different depths;
   the second engagement washer has a second through hole in a complementary shape to a cross-sectional shape of the body portion and at least one protrusion capable of being positioned in selective one of the recesses of the first engagement washer; and
   the elastic washer is capable of being forced upward into deformation by the second engagement washer; when an external force is applied on the head portion for rotation of the screw, the second engagement washer is brought into rotation with respect to the first engagement washer by the screw so that the protrusion of the second engagement washer is switched among the recesses of the first engagement washer; and
   by virtue of difference in interference extent caused by the protrusion of the second engagement washer being positioned in the different recesses of the first engagement washer, friction generated during rotation of the stand and the switchable structure with respect to the baseplate is capable of being adjusted.

2. The swivel supporting device of claim 1, wherein a larger interference extent between the first engagement washer and the second engagement washer is induced when the protrusion is engaged with shallower one of the recesses, and a smaller interference extent between the first engagement washer and the second engagement washer is induced when the protrusion is engaged with deeper one of the recesses.

3. The swivel supporting device of claim 2, wherein the stand includes a base, an upright extending from the base and a fixing plate associated with the upright for holding a display device.

4. The swivel supporting device of claim 3, wherein the switchable structure further includes a friction washer that is fastened to the stand and slidably contacts the baseplate.

5. The swivel supporting device of claim 4, wherein the friction washer and the first engagement washer are fastened to the base.

6. The swivel supporting device of claim 3, wherein (i) the base has a guide trough, (ii) the second engagement washer has an extension portion disposed in the guide trough, and (iii) when a force is applied on the head portion for rotation of the screw, the extension portion of the second engagement washer moves within the guide trough so as to restrict pivot angle of the screw.

7. The swivel supporting device of claim 3, wherein the baseplate includes a foundation plate and an abutment member fastened to the foundation plate, and the foundation plate has an opening to expose a selected portion of the abutment member from the opening and to permit the head portion of the screw to abut against the abutment member.

8. The swivel supporting device of claim 7, wherein the baseplate further includes a foot pad attached to the foundation plate.

9. The swivel supporting device of claim 7, wherein the elastic washer is a bowl-shaped washer.

10. The swivel supporting device of claim 1, wherein the first engagement washer has three recess sets around circumference, each of which has three recesses of different depths, whereas the second engagement washer has three protrusions that correspond to the three recess sets, respectively, and are capable of being simultaneously positioned in the corresponding recesses thereof with the same depth.

* * * * *